Figure 1:
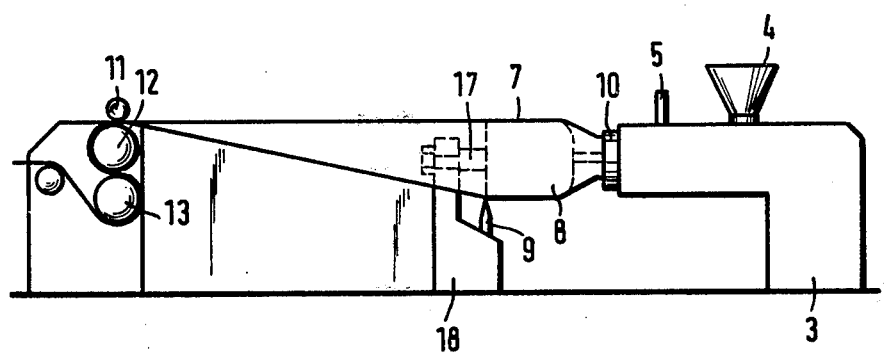

United States Patent [19]

Kolossow

[11] 4,160,638
[45] Jul. 10, 1979

[54] APPARATUS FOR FORMING SHEETS OF FOAMED SYNTHETIC PLASTICS MATERIAL

[75] Inventor: Klaus-Dieter Kolossow, Hamburen, Fed. Rep. of Germany

[73] Assignee: Hermann Berstorff Maschinebau GmbH, Hanover Kleefeld, Fed. Rep. of Germany

[21] Appl. No.: 872,637

[22] Filed: Jan. 26, 1978

[30] Foreign Application Priority Data

Feb. 2, 1977 [DE] Fed. Rep. of Germany ....... 2704231

[51] Int. Cl.² ............................................. B29D 27/00
[52] U.S. Cl. .................. 425/302.1; 264/209; 264/542; 425/308; 425/326.1; 425/380; 425/387.1; 425/467; 425/817 C
[58] Field of Search ................. 264/51, 54, 95, 209, 264/141, 150; 425/72 R, 4 C, 817 C, 467, 326.1, 380, 387.1, 325, 308, 404, 445, 302.1

[56] References Cited

U.S. PATENT DOCUMENTS 4,009,976  3/1977  Johnson ..................... 425/817 C X

FOREIGN PATENT DOCUMENTS 673305  10/1963  Canada ........................... 425/326.1

*Primary Examiner*—Roy Lake
*Assistant Examiner*—Mark Rosenbaum
*Attorney, Agent, or Firm*—Donald D. Jeffery

[57] ABSTRACT

Apparatus for forming sheets of foamed synthetic plastics material, comprising a screw extruder, a nozzle head having an extrusion passage therein and a nozzle core positioned in the extrusion passage so as to form an annular nozzle, a cooled calibrating mandrel of a diameter larger than that of the annular nozzle, disposed downstream of the screw extruder having regard to the direction of extrusion and mounted on a stand, blowing means for applying internal pressure to an extruded tube between the annular nozzle and the calibrating mandrel to expand the extruded tube to the diameter of the calibrating mandrel, cutting apparatus for cutting open the increased-diameter cooled foamed plastics tube and apparatus for laying out flat the cut-open tube, wherein the nozzle core is rigidly connected to the stand of the calibrating mandrel and is connected to the inner wall of the extrusion passage by a single web aligned with the cutting apparatus whereby weakened and marked regions of the laid-flat cut-open tube are provided only at the extreme longitudinal edges thereof.

1 Claim, 2 Drawing Figures

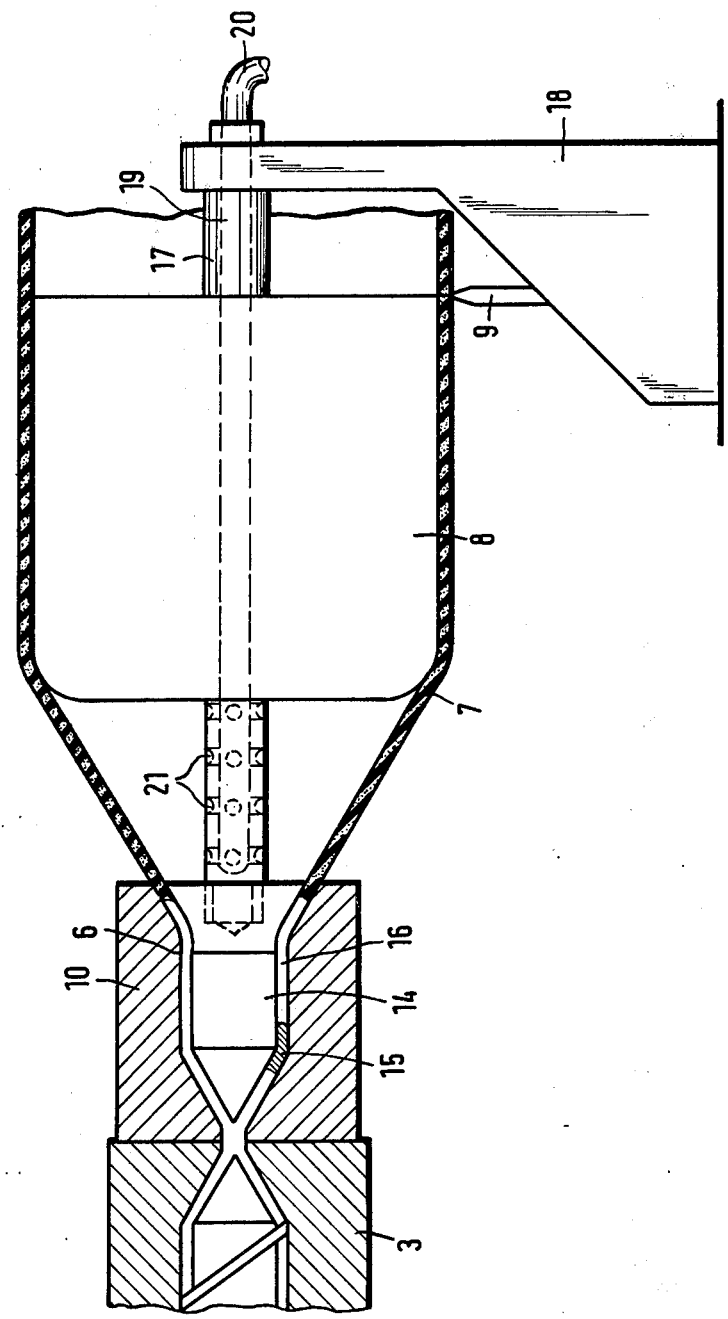

APPARATUS FOR FORMING SHEETS OF FOAMED SYNTHETIC PLASTICS MATERIAL

The invention relates to apparatus for forming sheets of foamed synthetic plastics material.

Such apparatus has been proposed having a screw extruder with an annular nozzle and, disposed downstream of the screw extruder, having regard to the direction of extrusion, a cooled calibrating mandrel of a diameter larger than that of the annular nozzle and a cutting apparatus for cutting open the increased-diameter cooled foamed plastics tube, and also an apparatus for laying out flat the cut-open tube.

It has been found that foamed plastics sheets produced on such apparatus show marks and have weak regions extending in the direction of flow. It was found that one cause of such marks and weak regions, arising from irregularities in the foam structure and which adversely affect the quality of the end product, is the web-like fixings connecting the core of the annular nozzle to the wall of the extrusion passage upstream of the extrusion orifice. Although attempts have been made to shift the connection of the nozzle core to the nozzle head farther upstream in the nozzle head, marks and weak regions continued to be observed extending in the direction of flow. It seems that the material being extruded, when it converges after the webs, does not blend so intensively as prior to the separation occasioned by the webs.

The invention is based on the problem of so constructing an apparatus of the kind described at the outset that no markings and weak points can be seen on the completed foamed plastics sheet. The intention is that the quality of the end product be distinquished by an even surface and structure of the foamed plastics material.

According to the invention, there is provided apparatus for forming sheets of foamed synthetic plastics material, comprising a screw extruder a nozzle head having an extrusion passage therein and a nozzle core positioned in the extrusion passage so as to form an annular nozzle, a cooled calibrating mandrel of a diameter larger than that of the annular nozzle, disposed downstream of the screw extruder having regard to the direction of extrusion and mounted on a stand, blowing means for applying internal pressure to an extruded tube between the annular nozzle and the calibrating mandrel, cutting apparatus for cutting open the increased-diameter cooled foamed plastics tube, and apparatus for laying out flat the cut-open tube, wherein the nozzle core is rigidly connected to the stand of the calibrating mandrel and is connected to the inner wall of the extrusion passage by a single web aligned with the cutting apparatus.

The invention makes it possible to impart to the nozzle core of the annular nozzle the necessary support against the high extrusion forces while nevertheless achieving a high quality of foamed plastics sheet. The connection between the nozzle core and the nozzle head is located aligned with the position at which the foamed plastics tube, enlarged by blowing, is eventually cut open so that it can be laid flat to form a sheet, whereby markings or weakened regions caused by the web will lie immediately adjacent the longitudinal edges of the sheet material where they will not affect the quality of the main part of the sheet and will probably be removed by a normal trimming of the sheet.

The invention is diagrammatically illustrated by way of example in the accompanying drawings, in which:

FIG. 1 shows apparatus according to the invention for producing sheets of foamed plastics material; and FIG. 2 shows on an enlarged scale a sectional view of a portion of FIG. 1 illustrating the annular nozzle and the cooled calibrating mandrel.

Referring to the drawings, polystyrene granulate is fed via a funnel 4 into a screw extruder 3 and is melted and blended with a propellant which is added through an injection valve 5. The screw extruder 3 has a nozzle head 10 in which an annular nozzle 6 is provided. The foamed polystyrene extruded in tubular form through the annular nozzle 6 is blown up to form a tube 7 of relatively large diameter compared with the diameter of the nozzle 6 and is drawn over a cooled calibrating mandrel 8. The foamed plastics tube 7 is slit open by a knife 9 and is spread out as a flat sheet by suitable laying-flat apparatus indicated here by rollers 11 to 13.

It can be seen from the longitudinal section in FIG. 2 that the annular nozzle 6 in the nozzle head 10 has a central core 14, preferably composed of a plurality of parts. The nozzle core 14 is rigidly connected to the nozzle head 10 via a fixing web 15. The fixing web 15 is disposed in the lowest place in the annular extrusion passage 16 in the annular nozzle 6.

Screwed rigidly into the end face of the nozzle core 14 is a supporting rod 17, the other end of which is mounted in a machine stand 18. Displaceable on the supporting rod 17 is the cooled calibrating mandrel 8. The supporting rod 17 has a central longitudinal bore 19 which connects a tube connector 20 for the supply of blowing and cooling air to outlet orifices 21 between the adjacent end faces of the nozzle core 14 and of the calibrating mandrel 8. The nozzle core 14 can additionally be kept at the right temperature via the supporting rod 17.

The apparatus described operates as follows:

The foamed polystyrene plastics material extruded in the form of a tube through the annular nozzle 6 is blown into a foamed plastics tube 7 of larger diameter and drawn over the cooling mandrel 8. The foamed plastics tube 7 is slit open by the knife 9 which is disposed at the lowest point of the periphery of the foamed plastics tube. Since the fixing web 15 is disposed at the lowest point in the annular extrusion passage 16, the foamed plastics tube 7, spread out in sheet form via a suitable laying-flat apparatus indicated here by the rollers 11 to 13, has any marked or weakened regions located at the extreme longitudinal side edges of the sheet.

What is claimed is:

1. Apparatus for forming sheets of foamed synthetic plastics material, comprising a screw extruder, a nozzle head having an extrusion passage therein and a nozzle core positioned in the extrusion passage so as to form an annular nozzle, a cooled calibrating mandrel of a diameter larger than that of the annular nozzle, disposed downstream of the screw extruder having regard to the direction of extrusion and mounted on a stand, blowing means operatively associated with said annular nozzle for applying internal pressure to an extruded tube between the annular nozzle and the calibrating mandrel to increase the diameter of the tube, cutting apparatus for cutting open the increased-diameter cooled foamed plastics tube, and apparatus downstream of the cutting apparatus for laying out flat the cut-open tube, wherein the nozzle core is rigidly connected to the stand of the calibrating mandrel and is connected to the inner wall of the extrusion passage by a single web located within the nozzle head at a position at which the tube is eventually cut open by the cutting apparatus.

* * * * *